(12) United States Patent
Harris et al.

(10) Patent No.: US 8,335,188 B1
(45) Date of Patent: Dec. 18, 2012

(54) METHOD AND SYSTEM FOR HANDOFFS BETWEEN PUBLIC AND PRIVATE WIRELESS NETWORKS

(75) Inventors: David L. Harris, Pleasanton, CA (US); Walter F. Rausch, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1163 days.

(21) Appl. No.: 12/123,010

(22) Filed: May 19, 2008

(51) Int. Cl.
*H04W 4/00* (2009.01)

(52) U.S. Cl. ........................................ 370/331; 455/434

(58) Field of Classification Search .......... 370/331–334; 455/434
See application file for complete search history.

(56) References Cited

U.S. PATENT DOCUMENTS

| | | | |
|---|---|---|---|
| 5,276,905 A | | 1/1994 | Hurst et al. |
| 5,818,824 A * | | 10/1998 | Lu et al. ........................ 370/328 |
| 5,995,834 A * | | 11/1999 | Moore .......................... 455/434 |
| 6,112,088 A * | | 8/2000 | Haartsen ....................... 455/437 |
| 6,334,052 B1 | | 12/2001 | Nordstrand |
| 6,477,372 B1 | | 11/2002 | Otting et al. |
| 6,501,951 B2 | | 12/2002 | Moore |
| 6,771,960 B1 | | 8/2004 | Otting et al. |
| 6,801,772 B1 * | | 10/2004 | Townend et al. ............. 455/436 |
| 6,826,414 B1 * | | 11/2004 | Reynolds et al. ............. 455/555 |
| 6,850,744 B2 | | 2/2005 | Moore |
| 6,970,719 B1 | | 11/2005 | McConnell et al. |
| 7,328,010 B2 | | 2/2008 | Turina et al. |
| 7,486,966 B2 * | | 2/2009 | Sayers et al. .................. 455/555 |
| 7,738,873 B2 * | | 6/2010 | Jagadeesan et al. .......... 455/436 |
| 2005/0266845 A1 | | 12/2005 | Aerrabotu et al. |
| 2006/0276189 A1 | | 12/2006 | Kiernan et al. |

FOREIGN PATENT DOCUMENTS

WO 2006/016841 A1 2/2006

OTHER PUBLICATIONS

Kamran Etemad et al., "Enhancements on Neighbor Advertisement Message," contribution to IEEE 802.16 Broadband Wireless Access Working Group, submitted Aug. 27, 2004.

* cited by examiner

*Primary Examiner* — Phuc Tran

(57) ABSTRACT

A mobile station receives a neighbor list from a base station in an area of a public wireless network that borders a private wireless network. The neighbor list includes encrypted channel identifiers corresponding to private network channels transmitted by the private wireless network and unencrypted channel identifiers corresponding to public network channels transmitted by the public wireless network. If the mobile station does not subscribe to the private wireless network, the mobile station does not recognize the encrypted channel identifiers and simply ignores them. However, if the mobile station subscribes to the private wireless network, the mobile station decrypts the encrypted channel identifiers and determines whether it is able to initiate a handoff to any of the corresponding private network channels.

12 Claims, 4 Drawing Sheets

METHOD AND SYSTEM FOR HANDOFFS BETWEEN PUBLIC AND PRIVATE WIRELESS NETWORKS

BACKGROUND

A wireless service provider that operates a public wireless network may also operate one or more private wireless networks. A private wireless network may provide wireless communication services to certain customers on a different basis than the public wireless network. For example, a private wireless network may provide different wireless communication services than the public wireless network or may provide similar wireless communication services but under a different rate plan. In many cases, a private wireless network may be set up for a particular enterprise, such as a business or other organization. As a result, the private wireless network may restrict access to only the authorized members of that enterprise.

A private wireless network may provide wireless coverage in areas that overlap or border wireless coverage areas provided by a public wireless network. Because of this proximity, one or more base stations in the private wireless network may be identified as neighbors in a neighbor list transmitted by a base station in the public wireless network. For a mobile station that subscribes to both the public wireless network and the private wireless network, this neighbor list can beneficially facilitate roaming between these networks. However, for a mobile station that subscribes to the public wireless network but not the private wireless network, the neighbor list has the disadvantage of identifying private network resources that the mobile station is not authorized to use.

OVERVIEW

In a first principal aspect, an exemplary embodiment provides a method for a base station. The base station wirelessly transmits a neighbor list to a mobile station. The neighbor list includes a plurality of channel identifiers, including at least one encrypted channel identifier.

In a second principal aspect, an exemplary embodiment provides a method for a mobile station that subscribes to both a private wireless network and a public wireless network. While being served by the public wireless network, the mobile station receives a neighbor list. The neighbor list includes at least one private network channel identifier corresponding to at least one private network channel transmitted by the private wireless network and at least one public network channel identifier corresponding to at least one public network channel transmitted by the public wireless network. After receiving the neighbor list, the mobile station determines whether the at least one private network channel satisfies a private network handoff criterion. If the private network handoff criterion is satisfied, the mobile station initiates a handoff to the at least one private network channel, without regard to the at least one public network channel.

In a third principal aspect, an exemplary embodiment provides a mobile station that subscribes to both a private wireless network and a public wireless network. The mobile station comprises at least one transceiver for wireless communication with the private wireless network and the public wireless network; a processor; data storage; and a plurality of program instructions stored in the data storage and executable by the processor. The program instructions are executable to perform the steps of: (a) receiving a neighbor list that includes a plurality of channel identifiers, including at least one encrypted channel identifier that corresponds to at least one private network channel transmitted by the private wireless network; and (b) decrypting the at least one encrypted channel identifier.

DETAILED DESCRIPTION OF EXEMPLARY EMBODIMENTS

1. Introduction

Figure 1:
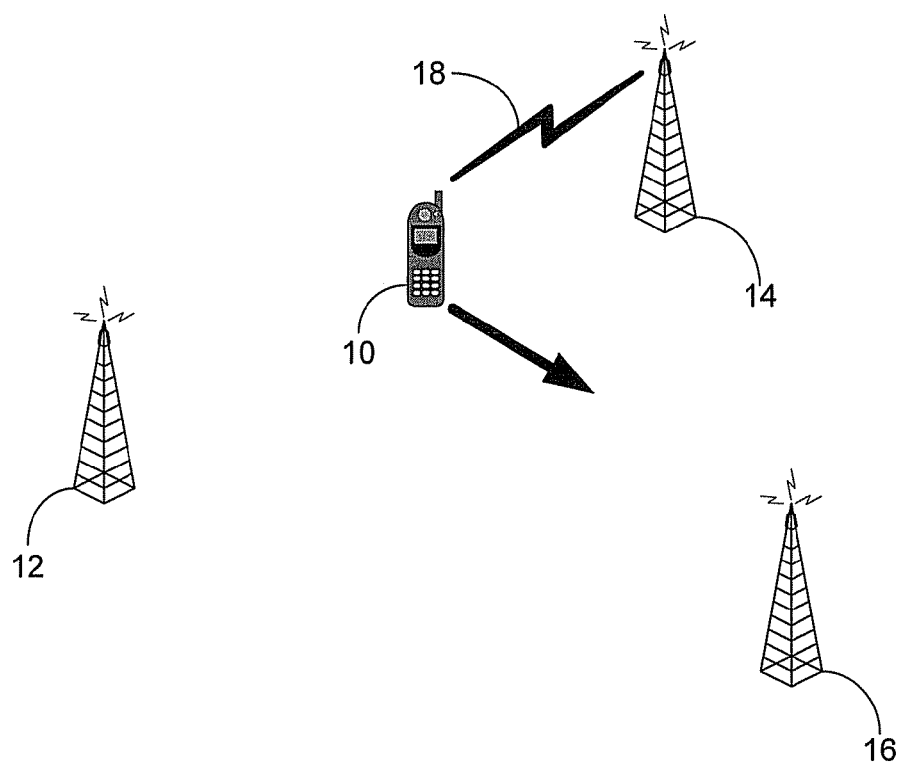
FIG. 1 is a schematic diagram of a configuration of base stations, in accordance with an exemplary embodiment.

The inventors have recognized that operating a private wireless network in an area that overlaps or borders the coverage area provided by a public wireless network can cause difficulties with respect to mobile stations that do not subscribe to the private wireless network. For example, a non-subscribing mobile station may try to use one or more channels transmitted by the private wireless network. Although the private wireless network may ultimately deny such attempts, the attempts may nonetheless create an undesirable load on the resources of the private wireless network.

To address such difficulties, the inventors propose the use of a neighbor list that identifies private network channels, i.e., channels transmitted by the private wireless network, in a foam that is recognizable to only those mobile stations that subscribe to the private wireless network. For example, the channel identifiers for private network channels may be encrypted. Mobile station stations that subscribe to the private wireless network would be able to decrypt the encrypted channel identifiers and use the corresponding private network channels. However, mobile stations that do not subscribe to the private wireless network would not recognize the encrypted channel identifiers as valid and, thus, would simply ignore them. In this way, mobile stations that subscribe to the private wireless network can be informed of the private network channels and be able to use them. However, non-subscribing mobile stations would not be informed of the private network channels, thereby reducing the possibility that a non-subscribing mobile station would try to use a private network channel.

The neighbor list could be transmitted by a base station in the public wireless network, e.g., by a base station that is located within or near the coverage area provided by the private wireless network. The neighbor list may include one or more encrypted channel identifiers corresponding to one or more private network channels transmitted by the private wireless network and one or more unencrypted channel identifiers corresponding to one or more public network channels transmitted by the public wireless network. Mobile stations that do not subscribe to the private wireless network would not recognize the encrypted channel identifiers. However, mobile stations that subscribe to the private wireless network would decrypt the encrypted channel identifiers so as to identify the private network channels.

In response to identifying the private network channels in the neighbor list, a subscribing mobile station may determine whether it is able to initiate a handoff to any of the private network channels in accordance with a private network handoff criterion. For example, the mobile station may determine whether any of the private network channels has a sufficiently high signal strength. If the private network handoff criterion is satisfied for a private network channel, the mobile station may initiate a handoff to that channel, without regard to any public network channel identified in the neighbor list. Thus, even though a public network channels may have a higher signal strength and may be a candidate for a handoff, the mobile station initiates a handoff to the private network channel instead.

If the private network handoff criterion is not met initially, the mobile station may continue checking periodically until an opportunity to handoff to the private wireless network is detected (or until the mobile station moves out of range of the private wireless network). In this way, a subscribing mobile station may be handed off to the private wireless network as soon as it is practical to do so.

2. Exemplary Network Architecture

FIG. 1 shows an exemplary configuration of base stations for purposes of illustration. In this configuration, a mobile station 10 is located in the vicinity of a plurality of base stations, exemplified in FIG. 1 by base station 12, base station 14, and base station 16. Mobile station 10 could be a wireless telephone, wireless personal digital assistant (PDA), wirelessly-equipped laptop computer or other wireless communication device. Base stations 12, 14, and 16 could include one or more base stations that are part of a public wireless network and/or one or more base stations that are part of a private wireless network. It is also possible that one or more of the base stations could serve both networks, e.g., transmitting both public network channels and private network channels. In the example described herein, base stations 12 and 14 are part of a public wireless network, and base station 16 is part of a private wireless network. Although FIG. 1 shows two base stations in the public wireless network and one base station in the private wireless network, it is to be understood that the public wireless network and/or private wireless network could include a greater number of base stations.

Base stations 12-16 may each provide wireless coverage in a respective area or areas, which may referred to as "cells" or "sectors." More particularly, a "cell" may refer to the entire wireless coverage area provided by a base station, whereas a "sector" may refer to part of the base station's coverage area, such as may be provided by directional antennas. Thus, a cell may encompass multiple sectors. The geographic extent of the wireless coverage areas provided by base stations 12-16 could be either non-overlapping or partially overlapping; or the wireless coverage area provided by one base station could be completely encompassed within the wireless coverage area provided by another base station.

As one example, base station 16 in the private wireless network may provide wireless coverage within one or more buildings and, in some cases, also the areas surrounding the one or more buildings. The one or more buildings could be used by a business, organization, or enterprise that subscribes to the private wireless network. However, base stations 12 and 14 in the public wireless network may also provide wireless coverage in at least part of the area served by base station 16. Thus, a mobile station that subscribes to the private wireless network may, in certain locations, be able to communicate with base station 16 in the private wireless network as well as base stations 12 and 14 in the public wireless network.

For example, mobile station 10 may communicate with base station 14 via an air interface 18, as shown in FIG. 1. The communications between mobile station 10 and base station 14 via air interface 18 may be in accordance with a protocol, such as cdma2000, GSM/GPRS, UMTS, IEEE 802.16 ("WiMAX"), or other wireless communications protocol. The same wireless communications protocol could be used throughout the entire public wireless network. Alternatively, different protocols could be used in different areas of the public wireless network. In the example described herein, the private wireless network uses the same wireless protocol as used for the communications via air interface 18. Alternatively, the private wireless network could use a wireless communications protocol that is different than that used in the public wireless network.

As shown in FIG. 1, mobile station 10 is located in the wireless coverage area provided by base station 14. However, as mobile station 10 moves to a different location, mobile station 10 may be served by a different base station, e.g., through a handoff process. For example, mobile station 10 may move into an area served by base station 12 and, as a result, may initiate a handoff from base station 14 to base station 12, i.e., staying within the public wireless network. However, in the example illustrated in FIG. 1, mobile station 10 is moving in the direction indicated by the arrow toward base station 16. Thus, in the case that mobile station 10 subscribes to the private wireless network, mobile station 10 may initiate a handoff from base station 14 in the public wireless network to base station 16 in the private wireless network.

Mobile station 10 may refer to a neighbor list to determine what base stations may be candidates for a handoff. For example, while being served by base station 14 in the public wireless network, mobile station 10 may receive a neighbor list via air interface 18. Base station 14 may periodically transmit the neighbor list over a paging channel. Alternatively, base station 14 may transmit the neighbor list in response to a request from mobile station 10. The format of the neighbor list may depend on the wireless communications protocol used over air interface 18. For WiMAX communications, the neighbor list could be a neighbor advertisement message in accordance with IEEE 802.16 standards. For CDMA communications, the neighbor list could be a neighbor list message in accordance with cdma2000 standards.

The neighbor list may identify channels that are available from neighboring cells or sectors. For example, with mobile station 10 being served by a particular sector of base station 14, the neighbor list transmitted by base station 14 may identify one or more channels transmitted by other sectors of base station 14, one or more channels transmitted by base station 12, and/or one or more channels transmitted by base station 16. The neighbor list may also identify channels transmitted by other base stations that are not shown in FIG. 1.

The neighbor list may identify channels by their frequencies, time slots, codes, phases, and/or in other ways. As described in more detail below, the channel identifiers for private network channels transmitted by the private wireless network may be included in the neighbor list in an encrypted form, whereas the channel identifiers for public network channels transmitted by the public wireless network may be unencrypted.

3. Exemplary Method of Operation

Figure 2:
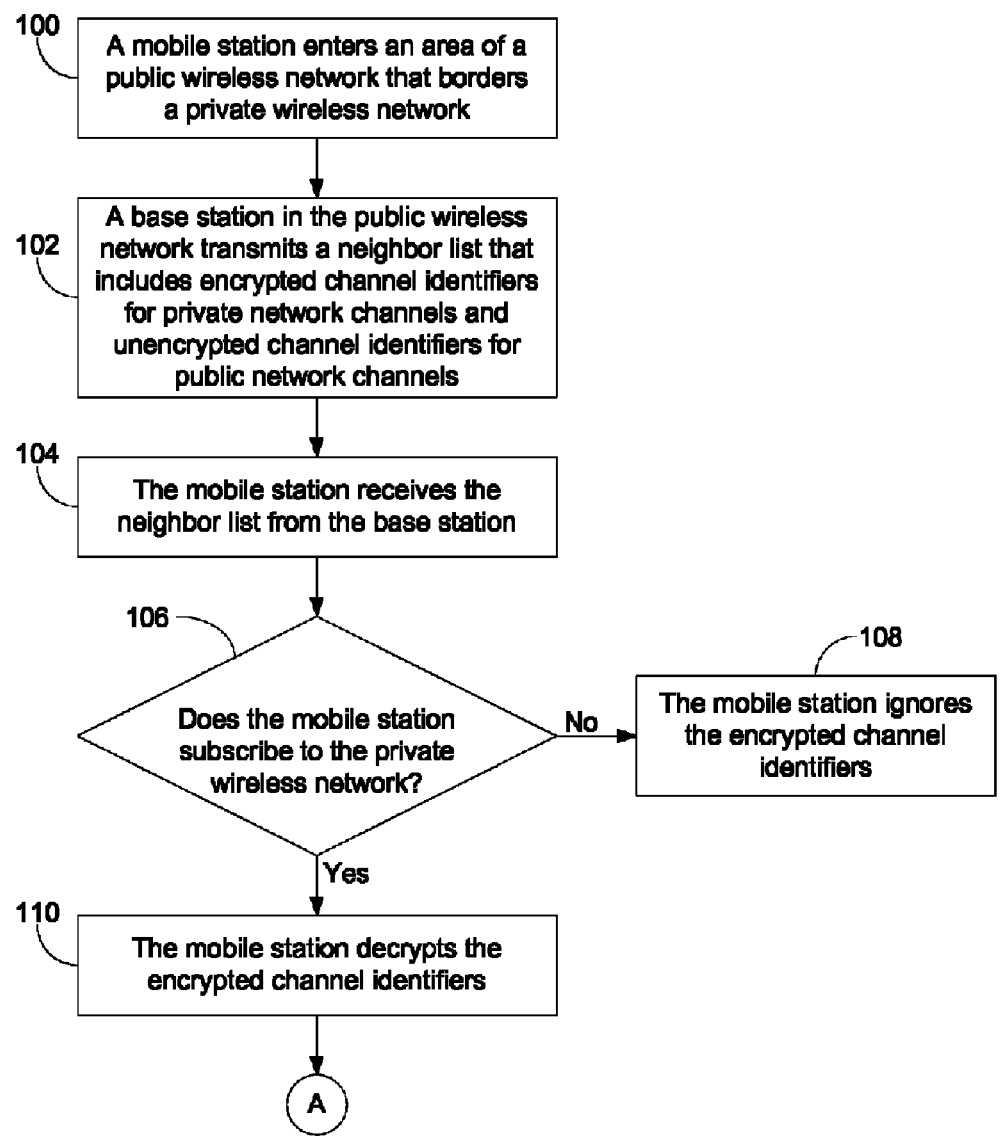
FIG. 2 is a flow chart illustrating a method of using a neighbor list, in accordance with an exemplary embodiment.
Figure 3:
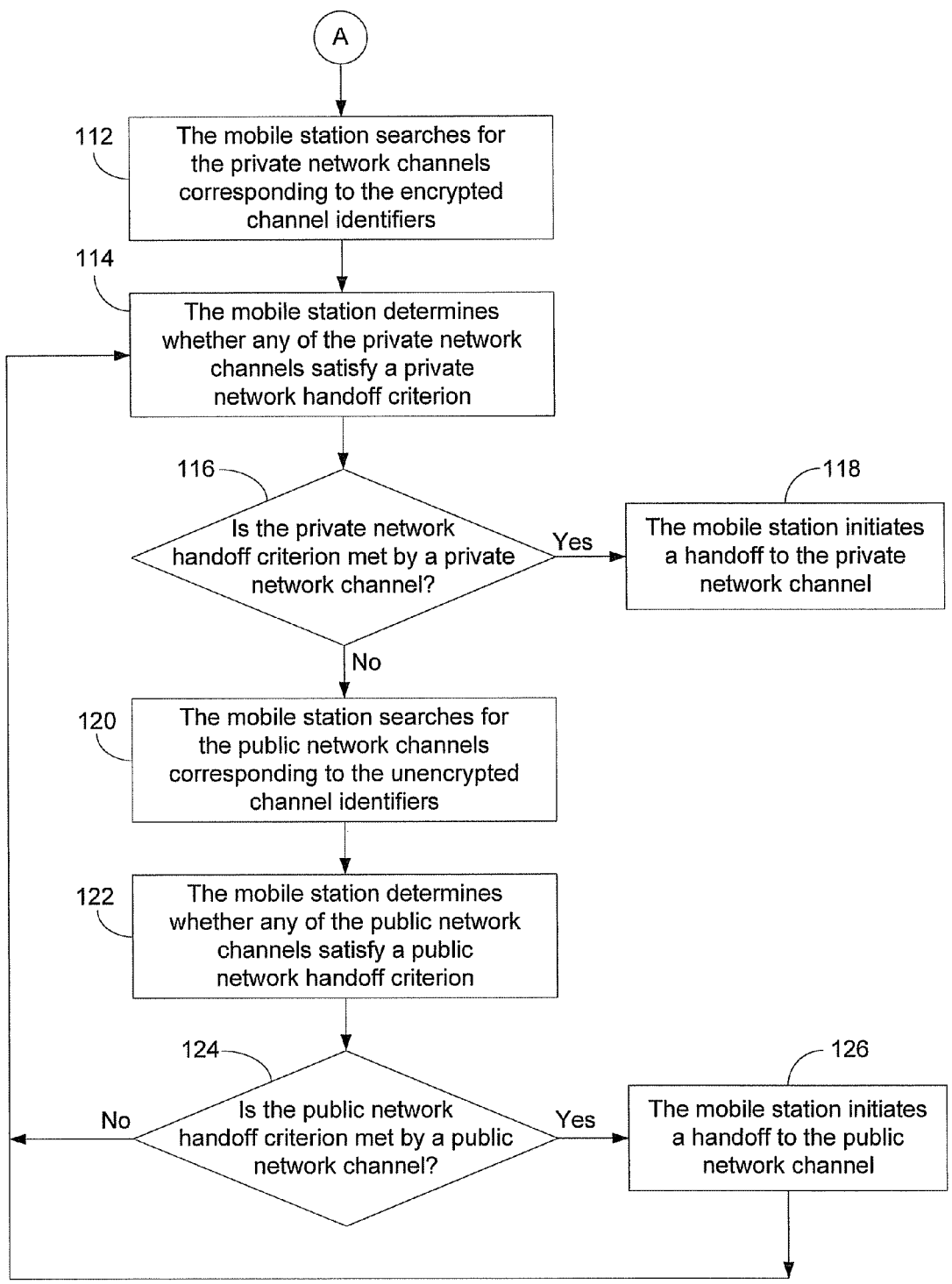
FIG. 3 is a flow chart illustrating a method of checking for handoff opportunities, in accordance with an exemplary embodiment.

FIGS. 2 and 3 are flow charts illustrating an exemplary method of operation. The example of FIGS. 2 and 3 is described with respect to the configuration illustrated in FIG. 1, i.e., with base stations 12 and 14 being part of a public wireless network and base station 16 being part of a private wireless network. It is to be understood, however, that similar methods could be used for other configurations.

With reference to FIG. 2, the process may begin when a mobile station (e.g., mobile station 10) enters an area of a public wireless network that borders a private wireless network, as indicated by block 100. In an exemplary embodiment, the border area is an area in which at least one base station in the private wireless network is identified as a neighbor in a neighbor list used in the public wireless network. It is to be understood, however, that border areas could be defined in other ways.

A base station in the public wireless network (e.g., base station 14) that serves this border area may transmit a neighbor list that includes encrypted channel identifiers corresponding to one or more private network channels transmitted by the private wireless network and one or more unencrypted channel identifiers corresponding to public network channels transmitted by the public wireless network, as indicated by block 102. For example, the encrypted channel identifiers may correspond to channels transmitted by base station 16 in the private wireless network and the unencrypted channel identifiers may correspond to channels transmitted by base stations 12 and 14 in the public wireless network.

The mobile station receives the neighbor list from the base station, as indicated by block 104. The mobile station may receive the neighbor list by monitoring a paging channel transmitting by the base station serving the mobile station or in some other manner. How the mobile station processes the neighbor list may depend on whether the mobile station subscribes to the private wireless network, as indicated by block 106. If the mobile station does not subscribe to the private wireless network, the mobile station may simply ignore the encrypted channel identifiers, as indicated by block 108. However, if the mobile station subscribes to the private wireless network, the mobile station may decrypt the encrypted channel identifiers, as indicated by block 110.

After decrypting the encrypted channel identifiers in the neighbor list, the mobile station may determine whether it is possible to initiate a handoff to the private wireless network. An exemplary handoff determination process is illustrated in FIG. 3. First, the mobile station may begin searching for the private network channels corresponding to the encrypted channel identifiers, as indicated by block 112. After locating the private network channels, the mobile station may determine whether any of the private network channels satisfy a private network handoff criterion, as indicated by block 114.

The private network handoff criterion may specify the conditions under which the mobile station is allowed to initiate a handoff to a private network channel. For example, a private network handoff criterion may require only that the received signal strength of a private network channel be greater than a predetermined threshold value in order to initiate a handoff. In that case, the mobile station may measure the signal strength of a private network channel and then compare the measured signal strength to the predetermined threshold value. The private network handoff criterion would then be met if the measured signal strength exceeds the predetermined threshold value. It is to be understood, however, that this private network handoff criterion is exemplary only, as other private network handoff criteria could be used.

How the mobile station proceeds may depend on whether the private network handoff criteria is met by any of the private network channels identified in the neighbor list, as indicated by block 116. If the private network handoff criterion is met by a private network channel, then the mobile station may initiate a handoff to that private network channel, as indicated by block 118. More particularly, the mobile station may initiate the handoff to the private network channel without regard to the public network channels identified in the neighbor list, e.g., without regard to the possibility that one of the public network channels may have a higher signal strength than the private network channel. In this way, the exemplary method illustrated in FIG. 3 does not necessarily find the "best" handoff candidate for the mobile station; instead, the exemplary method effects a handoff to the private wireless network as soon as it is practical to do so.

If the private network handoff criterion is not met, the mobile station may check again at a later time. For example, the mobile station may set a timer that causes the mobile station to determine periodically whether the private network handoff criterion is met by any private network channel and, if so, to initiate a handoff.

During the time when the mobile station is not checking for an opportunity to handoff to a private network channel, the mobile station may check for a possible handoff to a public network channel. Thus, after determining that the private network handoff criteria is not met by a private network channel, the mobile station may search for the public network channels corresponding to the unencrypted channel identifiers in the neighbor list, as indicated by block 120. The mobile station may then determine whether any of the public network channels satisfy a public network handoff criterion, as indicated by block 122. If the public network handoff criterion is met by a public network channel, then the mobile station may initiate a handoff to the public network channel, as indicated by blocks 124 and 126.

The public network handoff criterion may be different than the private network handoff criterion. In an exemplary embodiment, the public network handoff criterion is more stringent than the private network handoff criterion. For example, if handoff is based on received signal strengths, then the public network handoff criterion may require a higher received signal strength for a handoff than the private network handoff criterion. In addition, the public network handoff criterion may require a degradation in the conditions of the mobile station's current channel (e.g., with respect to signal strength, signal-to-noise ratio, bit error rate, block error rate, speech quality, $E_c/I_0$, and/or other parameters) in order for a handoff to another public network channel to be initiated. In this way, the public network handoff criterion may be such that a handoff to a public network channel occurs only when necessary, whereas the private network handoff criterion may be such that a handoff to a private network channel occurs as soon as practical.

The time-based approach for periodically checking private network channels against the private network handoff criterion may also encourage handoffs to the private wireless network. In this regard, regardless of whether the mobile station initiates a handoff to a public network channel, the mobile station may continue checking periodically for an opportunity to handoff to the private wireless network, as indicated by the flow from blocks 124 and 126 to block 114.

For example, as mobile station 10 moves toward private base station 16 in the direction indicated by the arrow in FIG. 1, mobile station 10 may periodically check whether a handoff to private base station 16 is possible (i.e., whether a channel transmitted by private base station 16 satisfies the private network handoff criterion). Eventually, mobile station 10 may get close enough that mobile station 10 detects a handoff opportunity and initiates a handoff to private base station 16.

4. Exemplary Mobile Station

Figure 4:
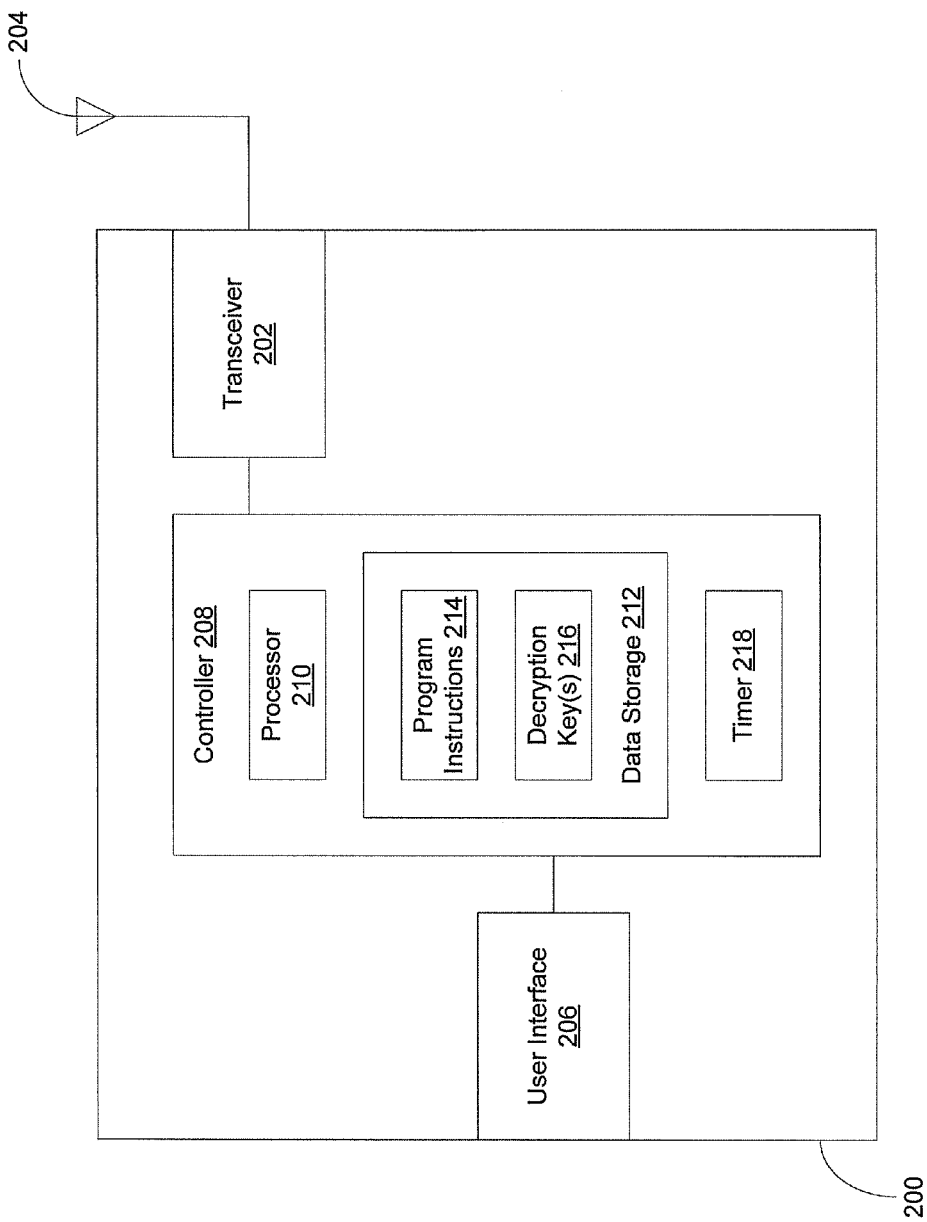
FIG. 4 is a block diagram of a mobile station, in accordance with an exemplary embodiment.

FIG. 4 illustrates an exemplary mobile station 200 that can operate in accordance with the methods illustrated in FIGS. 2 and 3. Mobile Station 200 includes a transceiver 202 for wireless communication with a public wireless network and a private wireless network, via an antenna 204. Although FIG. 4 shows only one transceiver, it is to be understood that mobile station 200 may use one transceiver for communicating with a public wireless network and another transceiver for communicating with a private wireless network, and these transceivers may communicate via either the same or separate antennas.

Mobile station 200 also includes a user interface 206 for obtaining input from a user of mobile station 200 and for conveying information to user. Thus, user interface 206 may include a keypad, touch screen, or other controls by which the user may provide input into mobile station 200. User interface 206 may also include a display for displaying textual, graphical, or other visual information to the user. Mobile station 200 may also be configured for voice communication. Thus, user interface 206 may include a microphone for receiving audio input from the user and a speaker for conveying audio to the user. Alternatively, mobile station 200 may communicate with an external microphone and/or speaker, for example, via a wireless connection.

The functioning of mobile station 200 may be controlled by a controller 208 coupled to communication transceiver 202 and to user interface 206. Controller 208 may comprise a processor 210 and data storage 212. Data storage 212 may include volatile and/or non-volatile memory. Data storage 212 may store program instructions 214 that are executable by processor 210 to control the functioning of mobile station 200. Data storage 212 may also store other information. For example, data storage 212 may store one or more decryption keys 216 for decrypting encrypted channel identifiers corresponding to one or more private wireless networks. Decryption keys 216 may be provisioned into mobile station 200 at the time of service activation or at a later time. For example, decryption keys 216 may be updated periodically. Controller 208 may also include a timer 218 for controlling the timing of operations, as described in more detail below.

Program instructions 214 may be executable by processor 210 so as to cause mobile station 200 to perform the functions illustrated in FIGS. 2 and 3 and described above. Thus, program instructions 214 may be executable to: (a) receive a neighbor list that includes at least one encrypted channel identifier that corresponds to at least one private network channel transmitted by a private wireless network and at least one unencrypted channel identifier that corresponds to at least one public network channel transmitted by a public wireless network; and (b) decrypt the at least one encrypted channel identifier, e.g., using decryption keys 216. It is to be understood mobile station 200 may subscribe to multiple private wireless networks, in which case, decryption keys 216 may include a respective decryption key for each private wireless network.

After decrypting an encrypted channel identifier so as to identify the corresponding private network channel, program instructions 214 may be further executable by processor 210 to determine whether the private network channel satisfies a private network handoff criterion and (i) if the private network handoff criterion is satisfied, to initiate a handoff to the private network channel; (ii) if the private network handoff criterion is not satisfied, to determine whether the at least one public network channel satisfies a public network handoff criterion. Program instructions 214 may also set timer 218 that causes program instructions 214 to check periodically whether any private network channel satisfies the private network handoff criterion and, if so, to initiate a handoff. In this way, mobile station 200 may conduct a time-based check for opportunities to handoff to private network channels, independently of the procedures used to check for handoff possibilities to public network channels.

5. Conclusion

Exemplary embodiments of the present invention have been described above.

Those skilled in the art will understand, however, that changes and modifications may be made to these embodiments without departing from the true scope and spirit of the invention, which is defined by the claims.

What is claimed is:

1. A method for a mobile station that subscribes to both a private wireless network and a public wireless network, said method comprising:
    while being served by said public wireless network, said mobile station receiving a neighbor list, said neighbor list including at least one private network channel identifier corresponding to at least one private network channel transmitted by said private wireless network and at least one public network channel identifier corresponding to at least one public network channel transmitted by said public wireless network, wherein said at least one private network channel identifier is encrypted; and
    after receiving said neighbor list:
    (a) said mobile station decrypting said at least one private network channel identifier;
    (b) said mobile station determining whether said at least one private network channel satisfies a private network handoff criterion; and
    (c) if said private network handoff criterion is satisfied, said mobile station initiating a handoff to said at least one private network channel without regard to said at least one public network channel.

2. The method of claim 1, further comprising:
    if said private network handoff criterion is not satisfied, said mobile station determining whether said at least one public network channel satisfies a public network handoff criterion.

3. The method of claim 2, wherein said private network handoff criterion differs from said public network handoff criterion.

4. The method of claim 1, further comprising:
    said mobile station periodically determining whether said at least one private network channel satisfies said private network handoff criterion.

5. The method of claim 1, wherein said mobile station determining whether said at least one private network channel satisfies a private network handoff criterion comprises:
    said mobile station measuring a signal strength of said at least one private network channel; and
    said mobile station comparing said signal strength to a predetermined threshold value.

6. The method of claim 1, wherein said neighbor list is an IEEE 802.16 neighbor advertisement message or a CDMA neighbor list message.

7. A mobile station that subscribes to both a private wireless network and a public wireless network, said mobile station comprising:
    at least one transceiver for wireless communication with said private wireless network and said public wireless network;
    a processor;
    data storage;

a plurality of program instructions stored in said data storage and executable by said processor to perform functions comprising:
(a) receiving a neighbor list, said neighbor list including a plurality of channel identifiers, said plurality of channel identifiers including at least one encrypted channel identifier that corresponds to at least one private network channel transmitted by said private wireless network and at least one unencrypted channel identifier that corresponds to at least one public network channel transmitted by said public wireless network;
(b) decrypting said at least one encrypted channel identifier;
(c) determining whether said at least one private network channel satisfies a private network handoff criterion; and
(d) if said private network handoff criterion is satisfied, initiating a handoff to said at least one private network channel.

8. The mobile station of claim 7, wherein said plurality of program instructions are executable by said processor to perform functions comprising:

(e) if said private network handoff criterion is not satisfied, determining whether said at least one public network channel satisfies a public network handoff criterion.

9. The mobile station of claim 7, wherein said plurality of program instructions are executable by said processor to perform functions (c) and (d) periodically.

10. The mobile station of claim 9, wherein said public network handoff criterion differs from said private network handoff criterion.

11. The mobile station of claim 7, wherein said neighbor list is an IEEE 802.16 neighbor advertisement message or a CDMA neighbor list message.

12. The mobile station of claim 7, wherein determining whether said at least one private network channel satisfies a private network handoff criterion comprises:
  measuring a signal strength of said at least one private network channel; and
  comparing said signal strength to a predetermined threshold value.

* * * * *